United States Patent Office 3,320,233
Patented May 16, 1967

3,320,233
1-AMINO-2-ANTHRAQUINONEAZO DYESTUFFS
Willy Braun, Heidelberg, and Ingo Paetzke, Ludwigshafen (Rhine), Germany, assignors to Badische Anilin- & Soda-Fabrik Aktiengesellschaft, Ludwigshafen (Rhine), Germany
No Drawing. Filed Dec. 16, 1964, Ser. No. 418,861
Claims priority, application Germany, Dec. 20, 1963, B 74,748
4 Claims. (Cl. 260—192)

The present invention relates to new valuable 2-anthraquinoneazo dyes having the formula:

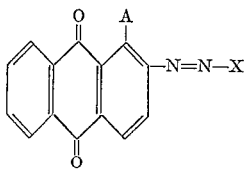

I in which:

A denotes an unsubstituted or substituted, optionally quaternized amino group which is free from carboxylic groups or sulfonic groups and Z denotes the radical of a coupling component and in which the anthraquinone nucleus may bear substituents, and to a process for the production of these dyes.

Those 2-anthraquinoneazo dyes are preferred which contain no radicals in the anthroquinone nucleus other than the substituents in 1-position. They have the general formula:

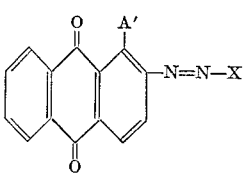

II in which:

A' denotes a pyridinium group, a toluenesulfamino group or a cyclohexylamino group but preferably denotes the H$_2$N— group and X denotes the radical of a coupling component of the benzene, naphthalene or pyrazolone series.

The new dyes are very suitable for dyeing or printing synthetic textile material.

Dyes having the general Formula I are obtained when:

(a) A 2-anthraquinoneazo compound having the general Formula III:

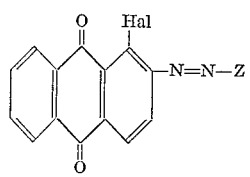

III in which:

Hal denotes a halogen atom,

Z has the meaning given above and the anthraquinone nucleus may bear substituents is treated with ammonia or with primary, secondary or tertiary amines or acid amides which are free from carboxylic and sulfonic groups, and the compounds containing a quaternary or acylated amino groups in 1-position in the anthraquinone nucleus and formed when tertiary amines or acid amides are used if necessary treated with acids or bases, or (b) A 1-nitroanthraquinoneazo compound having the general Formula IV:

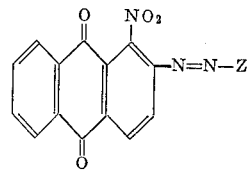

IV in which:

Z has the above meaning is treated with a mild reducing agent, or (c) A 2-aminoanthraquinone compound having the general Formula V:

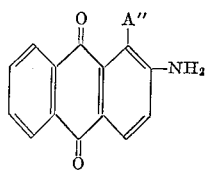

V in which A″ denotes an amino group which may be unsubstituted, substituted or quaternized and in which the anthraquinone nucleus may bear substituents is diazotized and coupled with a compound having the general formula H—Z or reacted with a nitroso compound having the general formula ON—Z (in which Z has the above meaning) and if desired the substituted or quaternary amino group is treated with an acid or base.

In the 2-anthraquinoneazo compounds having the Formulae III and IV which are required as initial materials for the new process, the part of the molecule of the coupling component represented by Z may belong to the basic or phenolic or enolic series of prior art coupling components. Examples of these are amines or phenols of the benzene or naphthalene series which may bear various substituents, and also aminophenols or aminonaphthols or also compounds such as pyrazolones or acetoacetic arylides or hydroxynaphthoic arylides.

In the 2-anthraquinoneazo compounds having the general Formula II and in the 2-aminoanthraquinone derivatives having the general Formulae IV and V, the anthraquinone nucleus may bear substituents, such as halogen atoms, preferably chlorine or bromine atoms, nitro groups, amino groups, arylamino groups, alkylamino groups, dialkylamino groups, cycloalkylamino groups, hydroxy groups, alkoxy groups or thioalkyl groups.

Mild reducing agents by which the azo bridge is not split are used for the reduction of the 1-nitroanthraquinoneazo compounds having the general Formula IV. Examples of such reducing agents are sodium hydrogen sulfide or potassium sulfide. The nitro group is thus reduced to the amino group.

When starting from anthraquinone compounds having the general Formula III, new dyes having the Formula I are obtained in which A denotes a primary, secondary, tertiary or quaternized amino group or an acylated amino group by reaction with ammonia, primary amines, secondary amines or tertiary amines or with acid amides. Amines for this reaction may belong to the aliphatic, cycloaliphatic, aromatic, araliphatic or heterocyclic series and should not contain any carboxylic or sulfonic groups. The following examples may be given: methylamine, dimethylamine, trimethylamine, ethylamine, diethylamine, triethylamine, propylamine, dipropylamine, butylamine, dibutylamine, ethanolamine, diethanolamine, triethanolamine, N-methylethanolamine, dimethylethanolamine, ethylene diamine, propylene diamine, butylene diamine, N,N-dimethylethylene diamine, N,N-dihydroxyethylene diamine, N,N-hydroxyethylethylene diamine, cyanoethylethylene diamine, cyclohexylamine, benzylamine, morpholine, piperazine, piperidine, aniline, methylaniline, ethylaniline, or aromatic amines bearing alkyl groups, hydroxyl groups or halogen atoms as substituents, such as toluidine, xylidine, 4-chloroaniline or 3-hydroxyaniline; 2-aminopyrimidine, imidazole, pyridine and quinoline. Examples of suitable amides are: methanesulfonamide, toluenesulfonamide, benzenesulfonamide and phthalimide.

Examples of acids or bases for reaction with the compounds containing a quaternized or acrylated amino group in 1-position in the anthraquinone nucleus are concentrated sulfuric acid, and organic bases, for example aniline, or inorganic bases, such as alkali metal hydroxides.

Initial compounds having the general Formula V which are required for diazotization should contain a protected amino group in 1-position because reaction of compounds having a free amino group in 1-position would give rise to undesirable secondary reactions. New dyes having the general Formula I which bear a free amino group in 1-position may also be obtained in this way by starting from compounds having the Formula V which contain quaternized or acylated amino groups as the radical A" and treating the resultant azo compounds with acids or bases.

The said embodiments of the process for the production of the new dyes complement each other very advantageously. In some cases the exchange of the substituents in 1-position in the anthraquinone nucleus may be difficult so that it is advantageous to start from compounds having the Formula V. On the other hand reaction of azo compounds having the Formulae III or IV may be preferred diazotization of compounds having the Formula V if it proceeds more smoothly. Accessibility of the initial compounds may also be important in the choice of the method.

The new dyes have a wide application and are very suitable for dyeing and printing synthetic textile material, such as fibers, filaments, threads, flock, woven fabrics and knitted fabrics of plastics, such as polyamides, polyurethanes, polyesters, and acetate. All the dyes, apart from those containing a quaternary amino group, dye polyester fibers by the high temperature or thermosol process and often also by the carrier method. Those of the new dyes which contain a quaternary amino group in 1-position in the anthraquinone nucleus are well suited for dyeing polyacrylonitrile fibers.

The 2-anthraquinoneazo dyes having the formula:

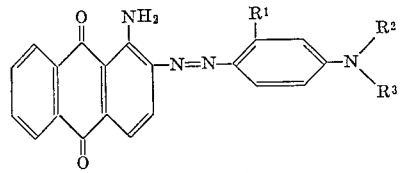

VI in which:

R¹ denotes a hydrogen atom, a halogen atom, a methyl group, an amino group, a hydroxy group or a methoxy group;

R² denotes an alkyl group having one to six carbon atoms and

R³ denotes a phenyl radical or an alkyl group having one to six carbon atoms, and the alkyl radicals R² and R³ may bear hydroxy groups, cyano groups, alkoxy groups or alkylamino groups, are of particular industrial interest.

The dyes, surprisingly, dye polyester material grey to pure black shades having very good fastness. Polyamide fibers may also be dyed with many of the dyes and some polyamides are dyed black shades.

The invention is further illustrated by the following examples in which parts are parts by weight.

*Example 1*

110 parts of 1-chloro-2-[4'-(N,N-hydroxyethylethylamino)-phenylazo]-anthraquinone (obtained by diazotization of 1-chloro-2-aminoanthraquinone and coupling with hydroxyethylethylaniline) is boiled in 1200 parts of amyl alcohol with 94 parts of p-toluenesulfamide, 29 parts of potassium acetate and 3 parts of copper acetate for some hours under reflux until a sample which has been suction filtered and washed contains no chlorine. The amyl alcohol is removed or distilled off with steam and the residue is washed with hot water. It may be washed with glacial acetic acid or acetonitrile to purify it. The dye, which probably has the constitution of a 1-tosylamino - 2 - [4' - (N,N - hydroxyethylethylamino) - phenylazo]-anthraquinone, dyes polyester fibers red-brown shades.

By starting in this example from appropriate amounts of the anthraquinoneazo compounds obtainable from the components specified in the following table, dyes are obtained which dye polyester fibers in the shades specified in the table.

TABLE

| Diazo component | Coupling component | Shade on polyester fibers |
|---|---|---|
| 1-chloro-2-aminoanthraquinone | m-Toluylene diamine | Red-brown. |
| Do | Dimethylaniline | Do. |
| Do | Diethylaniline | Do. |
| Do | Dimethyl-α-naphthylamine | Brown. |
| Do | Cyanoethylhydroxy-ethylaniline | Red. |
| Do | Hydroxyethylmethyl-aniline | Brown-red. |
| Do | Hydroxyethylbutyl-aniline | Do. |

*Example 2*

74 parts of the dye prepared according to the first paragraph of Example 1 is treated for three hours with concentrated sulfuric acid at room temperature. The solution is then poured onto ice, the residue is suction filtered and washed until neutral. It may be precipitated from water and washed with methanol to purify it. The dye formed dissolves in dimethylformamide with a blue color and in concentrated sulfuric acid with a brown color. If formaldehyde be added to the sulfuric acid solution, the color changes to green. The dye dyes polyester and polyamide fibers grey to black shades having good fastness properties.

By starting in this example from azo compounds obtained from the diazo compound specified in the first paragraph of Example 1 and the coupling components specified in the following table, the procedure being otherwise as stated, dyes are obtained which probably have the formula:

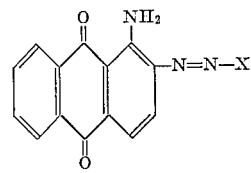

and which dye polyester fibers in the shades given in the table.

TABLE

| Coupling component | Shade on polyester fibers (2 to 4%) |
|---|---|
| Diethylaniline | Black |
| Dimethylaniline | Grey black |
| Dimethyl-m-toluidine | Black |
| Dihydroxyethylaniline | Grey |
| Cyanoethylhydroxyethylaniline | Grey |
| Hydroxyethylethyl-m-toluidine | Black |
| Hydroxyethylmethylaniline | Grey |
| Hydroxyethylbutylaniline | Grey |
| N-ethyldiphenylamine | Black |
| β-hydroxypropylethylamine | Black |
| β-methoxyethylacetylhydroxymethylaniline | Black |

Example 3

160 parts of 1-cyclohexylamino-2-aminoanthraquinone is dissolved in 1200 parts of concentrated sulfuric acid and this solution is dripped into a mixture of 60 parts of sodium nitrite and 1000 parts of ice-water. When complete diazotization has taken place, any excess of nitrous acid is destroyed with urea and the solution is suction filtered. The residue is suspended in water and the pH value of the mixture is adjusted to about 4. The suspension is slowly added to a solution of 90 parts of hydroxyethylethylaniline in 800 parts of 1 N-hydrochloric acid, 800 parts of 2 N-acetic acid and a little methanol. The whole is stirred until coupling is complete. The residue is suction filtered and washed with water. The dye formed probably has the constitution of a 1-cyclohexylamino - 2-[4'-(N,N-hydroxyethylethylamino)-phenylazo]-anthraquinone. It dyes polyester materials and polyamide fibers red shades.

If an appropriate amount of the coupling components specified in the following table be used instead of 90 parts of hydroxyethylethylaniline, similar dyes are obtained which dye polyester, polyamide and acetate fibers in the shades given in the table.

TABLE

| Coupling component | Shade on fibers of— | | |
|---|---|---|---|
| | polyester | polyamide | acetate |
| m-Aminophenol | Red | Red-brown | Orange. |
| Resorcinol | Brown-yellow | Brown | |
| p-Naphthol | Orange red | | |
| Phenol | Brown-yellow | Golden-yellow | |
| Acetoacetyl anilide | Green-yellow | | |
| 1-phenyl-3-methyl-5-pyrazolone | Yellow | | |
| β-Hydroxyethylbutylaniline | Red | | |
| Dimethylaniline | Red | | |
| Diethylaniline | Red | | |
| Dimethyl-m-toluidine | Red | | |
| p-Hydroxyethylethylaniline | Red | | |

Example 4

10 parts of 1-chloro-2-[4'-(N,N-hydroxyethylethylamino)-phenylazo]-anthraquinone is boiled with 80 parts of pyridine for some hours under reflux until the whole has become soluble in water. The whole is cooled and the residue is suction filtered and washed with acetone until free from pyridine. The crystallized 1-pyridinium salt of the corresponding anthraquinone has a green surface lustre and dyes polyacrylonitrile fibers violet.

Example 5

10 parts of the compound prepared in Example 4 is added to 100 parts of aniline and stirred for twenty-four hours at room temperature. After a steam distillation has been carried out, the dye formed is suction filtered. It dissolves in dimethylformamide with a blue color and in concentrated sulfuric acid with a green-brown color. The sulfuric acid solution changes in color to deep green when formaldehyde is added. The dye gives grey to black dyeings on polyester materials and polyamide fibers. The compound formed is probably identical with the dye prepared according to Example 2.

Example 6

104 parts of 1-chloro-2-[4'-(N,N-hydroxyethylethylamino)-phenylazo]-anthraquinone is boiled in 1200 parts of amyl alcohol with 58 parts of p-toluenesulfamide, 27 parts of potassium acetate and 1.2 parts of copper acetate for four hours under reflux; another 17 parts of p-toluenesulfamide is then added and boiling continued for another two hours. Suction filtration is carried out cold and the residue is washed with ligroin. The dye described in Example 1 is obtained in a good yield. The amyl alcohol filtrate, which still contains unchanged p-toluenesulfamide, may be used again without purification. The amyl alcohol may be replaced by isobutanol.

Example 7

7 parts of 1-chloro-2-(2'-methyl-4'-aminophenylazo)-anthraquinone is boiled with 70 parts of pyridine for twenty-four hours under reflux and suction filtered cold. The 1-pyridinium salt dyes polyacrylonitrile fibers red brown.

Example 8

10 parts of the pyridinium compound prepared according to Example 4 is boiled with 50 parts of piperidine for a short time, 50 parts of water is added, the whole boiled for five minutes and then another 700 parts of water is dripped in during the course of thirty minutes while boiling under reflux. Filtration is carried out while hot. The residue is washed with water, dilute hydrochloride acid and again with water and then dried. The compound formed in a quantitative yield is identical with the dye prepared according to Examples 2 and 5.

Example 9

5 parts of 1-chloro-2-[4'-(N,N-hydroxyethylethylamino)-phenyl-azo]-anthraquinone, 3 parts of metarsenic acid and 80 parts of 60% aqueous ammonia are heated at 80° C. for two hours, 110° C. for three hours, 120° C. for four hours and 150° C. for half an hour. After cooling, the residue is washed with dilute ammonia and then with water. A dye is obtained in a very good yield which dyes polyester and polyamide fibers grey to black shades.

Orthoarsenic acid may be used instead of metarsenic acid. Even without using arsenic acid there are obtained better results in 60% ammonia than in 25% ammonia.

The dye may be purified as follows:

8 parts of the dye is dissolved in 80 parts of concentrated sulfuric acid and the solution is poured onto 300 parts of ice. The whole is suction filtered and the residue is washed with dilute hydrochloric acid and with water. Purification may also be effected by boiling up with dilute hydrochloric acid or by fractional precipitation from acidified dimethylformamide solution with water. The violet components are converted into the desired form by the acid treatment and small amounts of a

We claim:
1. A dye of the formula

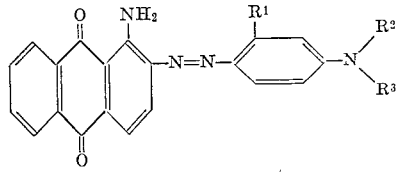

wherein $R^1$ is a member selected from the class consisting of hydrogen and methyl, $R^2$ is a member selected from the class consisting of alkyl of 1 to 6 carbon atoms, hydroxyethyl, hydroxypropyl and cyanoethyl, and $R^3$ is a member selected from the class consisting of alkyl of 1 to 6 carbon atoms, phenyl, hydroxyethyl, hydroxypropyl and cyanoethyl.

2. The dye of the formula

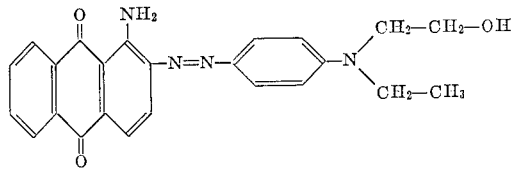

3. The dye of the formula

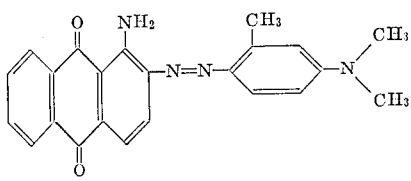

4. The dye of the formula

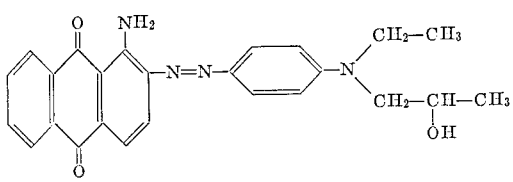

References Cited by the Examiner
UNITED STATES PATENTS 1,788,314  1/1931  Mayer et al. _____ 260—192
2,221,029  11/1940  McNally et al. _____ 260—192 X CHARLES B. PARKER, *Primary Examiner.*

FLOYD D. HIGEL, *Assistant Examiner.*